US012705566B2

(12) United States Patent
Singh et al.

(10) Patent No.: US 12,705,566 B2
(45) Date of Patent: Aug. 11, 2026

(54) SYSTEM AND METHOD FOR TRACKING SMART LABEL

(71) Applicant: JIO PLATFORMS LIMITED, Ahmedabad (IN)

(72) Inventors: Gulprit Singh, Bengaluru (IN); Dhananjaya Lankalapalli, Bangalore (IN); Vishal Shashikant Patil, Bangalore (IN); Shyam Sunder Maheshwari, Jaipur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 191 days.

(21) Appl. No.: 18/579,288

(22) PCT Filed: Aug. 25, 2023

(86) PCT No.: PCT/IB2023/058429

§ 371 (c)(1),
(2) Date: Jan. 12, 2024

(87) PCT Pub. No.: WO2024/047492

PCT Pub. Date: Mar. 7, 2024

(65) Prior Publication Data

US 2024/0428178 A1 Dec. 26, 2024

(30) Foreign Application Priority Data

Aug. 31, 2022 (IN) ............................ 202221049808

(51) Int. Cl.
*G06Q 10/0833* (2023.01)

(52) U.S. Cl.
CPC ................................ *G06Q 10/0833* (2013.01)

(58) Field of Classification Search
CPC ...... G06Q 10/0833; H04W 4/38; H04W 8/02; H04W 12/40; H04W 4/029; H04W 4/70;
(Continued)

(56) References Cited

U.S. PATENT DOCUMENTS 10,349,266 B1 7/2019 Kant
10,764,746 B1 * 9/2020 Dreiling .................. H04W 8/26
(Continued)

OTHER PUBLICATIONS

International Search Report and Written Opinion issued by the International Searching Authority issued in related Foreign Application No. PCT/IB2023/058429, mailed Dec. 19, 2023 (9 pgs.).

*Primary Examiner* — Emerson C Puente
(74) *Attorney, Agent, or Firm* — FINNEGAN, HENDERSON, FARABOW, GARRETT & DUNNER LLP

(57) ABSTRACT

The present disclosure provides a system and a method for transferring subscriber identifier attribute of label units (110) on replacement. The system includes one or more label units (110) attached to a corresponding object (106) from one or more objects in transit, a first label unit (110-1) replaced by a second label unit (110-2) when said first label unit (110-1) is damaged, wherein a subscriber identifier attribute of the first label unit (110-1) is transferred to the second label unit (110-2) after said replacement. The system includes a tracking system (102) that receives a second set of signals from the second label unit (110-2), updates a database (210) coupled to the tracking system (102) with the second set of unique identifier attributes of the second label unit (110-2), and tracks the objects (106) by receiving one or more tracking and monitoring data from the second label unit (110-2).

19 Claims, 5 Drawing Sheets

(58) Field of Classification Search
CPC ....... H04W 8/205; H04W 12/72; G06F 11/16; G16Y 40/35
See application file for complete search history.

(56) References Cited

U.S. PATENT DOCUMENTS

| | | | | |
|---|---|---|---|---|
| 2012/0126973 | A1* | 5/2012 | DeAngelis | A63B 24/0062 340/539.13 |
| 2014/0292490 | A1 | 10/2014 | Butler et al. | |
| 2016/0379163 | A1 | 12/2016 | Johanson et al. | |
| 2018/0234787 | A1 | 8/2018 | Karimli et al. | |
| 2020/0252754 | A1* | 8/2020 | Klinkner | G01S 5/04 |
| 2023/0199471 | A1* | 6/2023 | Chaugule | H04W 8/18 455/411 |
| 2023/0211638 | A1* | 7/2023 | Forthoffer | B60D 1/26 280/479.1 |
| 2023/0232186 | A1* | 7/2023 | Kjaldgaard | G08B 7/06 455/456.1 |
| 2024/0056772 | A1* | 2/2024 | Loda | H04W 4/024 |

* cited by examiner

300

TRACKING SYSTEM 102

SECOND APPLICATION ENGINE 124-2

FIRST APPLICATION ENGINE 124-1

SENSORS 116-2

SENSORS 116-1

POWER SUPPLY UNIT 118-2

POWER SUPPLY UNIT 118-1

110-2

110-1

114-2

114-1

122-2

122-1

120-2

120-1

126-2

SYSTEM AND METHOD FOR TRACKING SMART LABEL

RESERVATION OF RIGHTS

A portion of the disclosure of this patent document contains material, which is subject to intellectual property rights such as but are not limited to, copyright, design, trademark, integrated circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The present disclosure relates to a method and a system for providing fleet and cargo management via Internet of Things (IoT) devices, and more particularly, to a method and a system for transferring subscriber identifier attributes of label units on replacement.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With the introduction of Internet of Things (IoT) technology, world is moving towards technological advancement across all fields. One such field is the cargo and fleet management. There are IoT devices in market that come with monitoring and tracking capabilities. These IoT devices are attached to the objects or artefacts in transit for tracking monitoring. Once these devices are associated to a package and activated, they communicate with cloud network for tracking and monitoring purpose. As these IoT devices are generally attached to a package on the exterior, there are high possibilities that such devices may get damaged during transport due to rough handling.

IoT devices are prone to get easily damaged due to their delicate form-factor. Once damaged, it becomes difficult to track and monitor such products until the damaged IoT devices are replaced. Further, once the damaged IoT devices are replaced, an additional task of associating the data generated from the newer IoT product may be performed. This process is time-consuming, and may delay the delivery of the object to its destination. Furthermore, timely replacement of the IoT devices may be important to ensure minimal loss of tracking and monitoring data. In many instances, it may be difficult to ascertain whether an IoT device is damaged without manual or automated inspection.

There is, therefore, a need in the art to provide a mechanism that can mitigate the problems associated with the prior art(s).

OBJECTS OF THE PRESENT DISCLOSURE

Some of the objects of the present disclosure, which at least one embodiment herein satisfies are as listed herein below.

An object of the present disclosure is to provide a system and a method for transferring subscriber identifier attribute of label units on replacement.

Another object of the present disclosure is to provide a system and a method for seamless replacement of a first label unit that is damaged with a second label unit without loss in tracking information associated with objects in transit.

Another object of the present disclosure is to provide a system and a method that associates a unique identifier of the first label unit with the second label unit after replacement, so as to identify the object that the monitoring and tracking data collected by the second label unit relates to.

Another object of the present disclosure is to provide a system and a method that notifies operators of the system of damage caused to the first label unit for timely replacement.

Yet another object of the present disclosure is to provide a system and a method that ensures continuous tracking and monitoring of the object in transit even when the label unit associated thereto is damaged.

SUMMARY

Aspects of the present disclosure relate generally to method and a system for providing fleet and cargo management via Internet of Things (IoT) devices, and more particularly, to a method and a system for transferring subscriber identifier attributes of label units on replacement.

In an aspect, a system for tracking label units may include one or more label units attached to a corresponding object from one or more objects in transit. A first label unit from the one or more label units may be replaced by a second label unit from the one or more label units based on said first label unit being damaged. A subscriber identifier attribute of the first label unit may be transferred to the second label unit after said replacement. The system includes a tracking system having one or more processors coupled to a memory, the memory having one or more processor-executable instructions, which when executed, cause the one or more processors to receive a second set of signals from the second label unit having the subscriber identifier attribute and a second set of unique identifier attributes associated with the second label unit. The one or more processors may update a database coupled to the tracking system such that a first set of unique identifier attributes of the first label unit associated with the subscriber identifier attribute may be replaced with the second set of unique identifier attributes of the second label unit. The one or more processors may track the object in transit by receiving one or more tracking and monitoring data from the second label unit.

In an embodiment, the subscriber identifier attribute may be a Mobile Station International Subscriber Directory Number (MSISDN) number associated with a Subscriber Identity Module (SIM), and the first or second set of unique identifier attributes may be indicative of any one or combination of International Mobile Equipment Identity (IMEI) number of the corresponding label unit, an Integrated Circuit Card Identification Number (ICCIN), and an International Mobile Subscriber Identity (IMSI) of the corresponding label unit.

In an embodiment, when the first label unit may be replaced by the second label unit, the second label unit may be configured to transmit a third set of signals with said subscriber identifier attribute and the second set of unique identifier attributes to a Home Subscriber Server (HSS) of a cellular network such that a SIM associated with the first label unit may be deactivated and the subscriber identifier attribute associated with the first label unit may be transferred to the second label unit by the HSS.

In an embodiment, on said replacement, a first application engine of the first label unit and a second application engine of the second label unit may establish a 2-way encrypted communication channel therebetween via corresponding connector interfaces, the first application engine being configured to transmit the subscriber identifier attribute and the first set of unique identifier attributes to the second application engine, and the second label unit being configured to use the subscriber identifier attribute transmitted thereto to communicate with the tracking system via the cellular network.

In an embodiment, a SIM associated with the first label unit may be deactivated and the subscriber identifier attribute associated with the first label unit may be transferred to the second label unit when the tracking system transmits a third set of signals with said subscriber identifier attribute and the second set of unique identifier attributes to a HSS of a cellular network on determining that the first label unit is damaged to initiate said transfer.

In an embodiment, to determine whether the first label unit may be damaged, the one or more processors may be configured to receive a first set of signals from the first label unit indicating damage caused thereto and determine that said first label unit may be damaged, or determine that the first label unit may be damaged if the time from a last signal received from the first label unit may be greater than a predetermined time threshold. In an embodiment, the one or more processors may be configured to transmit a fourth set of signals to an operator at a subsequent location of a path associated with the objects in transit if the first label unit is damaged. In an embodiment, each of the one or more label units may include a communication unit for transmitting to and receiving data from the tracking system, and a conductive strip covering the label unit such that when said label unit may be damaged, the conductive strip may cause the one or more sensors to detect the damage and transmit a first set of signals to the tracking system via the communication unit.

In an embodiment, the one or more label units may include one or more sensors that detect and collect one or more tracking and monitoring data from the object in transit, and an audio-visual unit to provide any one or combination of audio and visual indications of damage to the label unit to an operator of the system.

In an embodiment, to update the database, the one or more processors may be configured to verify identity of the second label unit by mapping the first set of unique identifier attributes associated with the subscriber identifier attribute stored in the database with the second set of unique identifier attributes in the second set of signals, wherein the second set of signals may include the subscriber identifier attribute that was transferred to the second label unit, and determine whether the current location of the object in transit provided in the one or more tracking and monitoring data in the second set of signals may be in the same path as a predetermined transit route of said object in transit.

In an aspect, a method for tracking label units may include configuring a first label unit to an object in transit, the first label unit adapted to detect and transmit one or more tracking and monitoring data to a tracking system. The method may include replacing the first label unit with a second label unit when said first label unit may be damaged, wherein a subscriber identifier attribute of the first label unit may be transferred to the second label unit after said replacement. The method may include receiving, by a tracking system, a second set of signals from the second label unit having the subscriber identifier attribute and a second set of unique identifier attributes associated with the second label unit. The method may include updating, by the tracking system, a database coupled to the tracking system such that a first set of unique identifier attributes of the first label unit associated with the subscriber identifier attribute may be replaced with the second set of unique identifier attributes of the second label unit. The method may also include tracking, by the tracking system, the object in transit by receiving the one or more tracking and monitoring data from the second label unit.

In an aspect, a user equipment may include one or more processors, and a memory operatively coupled to the one or more processors, wherein the memory may include processor-executable instructions, which on execution, cause the one or more processors to transmit a fifth set of signals to a tracking system requesting one or more tracking and monitoring data on an object in transit using a subscriber identifier attribute associated with a first label unit attached to said object, the first label unit being replaced by a second label unit and the subscriber identifier attribute being transferred to the second label unit on said replacement, where the subscriber identifier attribute is transferred to the second label unit on transmission of a third set of signals by the second label unit or the tracking system. The one or more processors may receive a sixth set of signals from the tracking system having the requested one or more tracking and monitoring data.

In an aspect, the present disclosure relates to a non-transitory computer-readable medium may include processor-executable instructions that implement the system and the method of the present disclosure.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
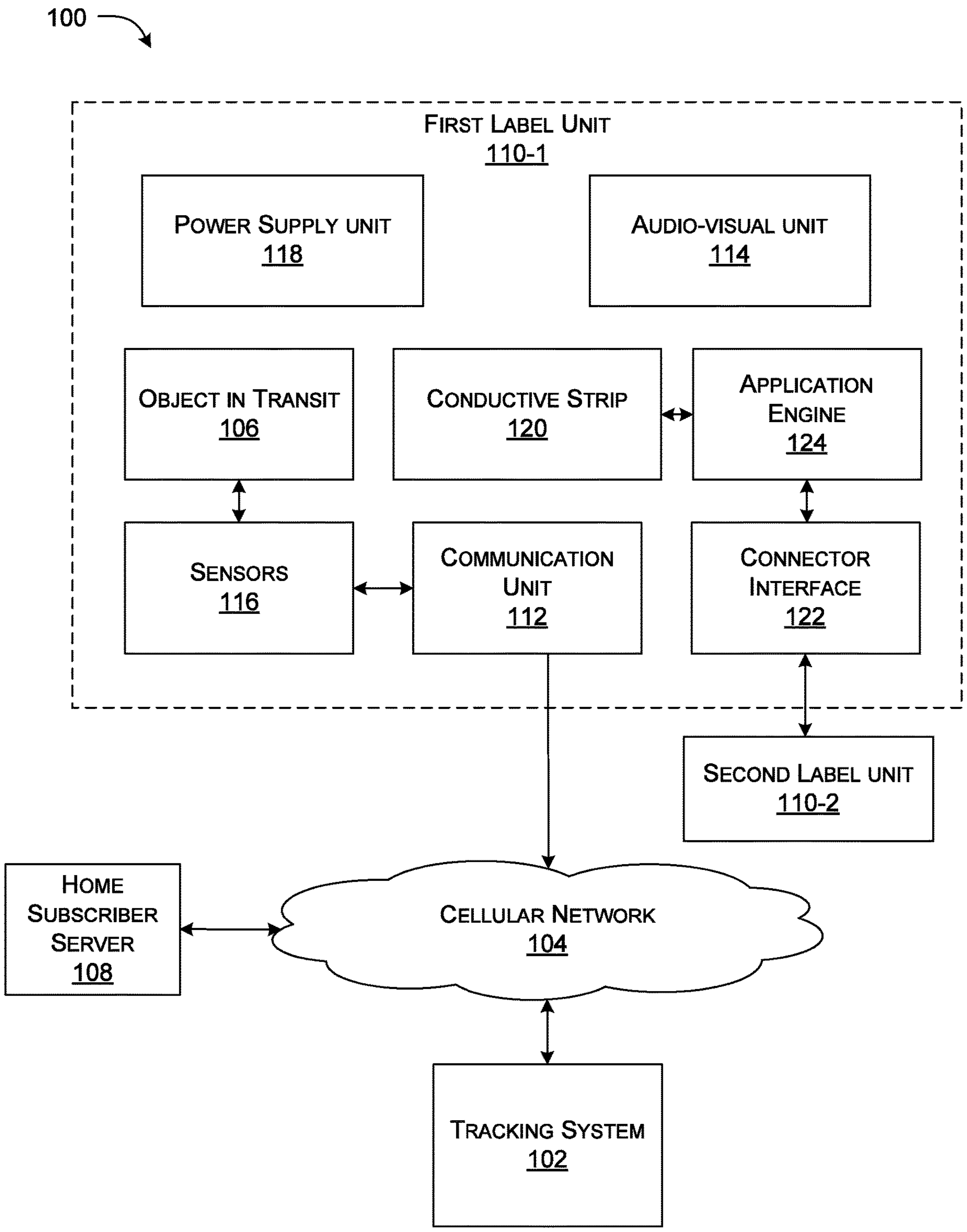
FIG. 1 illustrates an exemplary architecture in which or with which a proposed system (100) may be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present disclosure provides a system and a method for transferring subscriber identifier attribute of label units on replacement. The system includes one or more label units attached to a corresponding object from one or more objects in transit, a first label unit replaced by a second label unit when said first label unit is damaged, wherein a subscriber identifier attribute of the first label unit is transferred to the second label unit after said replacement. The system includes a tracking system that receives a second set of signals from the second label unit, updates a database coupled to the tracking system with the second set of unique identifier attributes of the second label unit, and tracks the objects by receiving one or more tracking and monitoring data from the second label unit.

The various embodiments throughout the disclosure will be explained in more detail with reference to FIGS. 1-5. The embodiments in the forthcoming figures are described in the context of cargo and fleet management. Particularly, the forthcoming disclosures are described in its applications in tracking and monitoring one or more objects in transit with corresponding tracking or smart label devices.

FIG. 1 illustrates an exemplary system architecture of the proposed system (100), in accordance with an embodiment of the present disclosure.

As illustrated, in an embodiment, the proposed system (100) may include a tracking system (102). In an embodiment, the tracking system (102) may include one or more input devices, one or more output devices, one or more power devices, and one or more communication modules operatively coupled to the tracking system (102). In an exemplary embodiment, the one or more input devices may include a keypad, touchpad, and the like, but not limited to the same. The keypad may be configured to acquire one or more attributes of the entity or object or packaging details and other state parameters associated with the object. The one or more output devices may include a display unit, an audio unit, and the like, but not limited to the same.

In an embodiment, the tracking system (102) may be communicatively coupled with one or more label units (110). The one or more label unit (110) may be an Internet of Things (IoT) device, but not limited to the same, where each label unit (110) may be attached to a corresponding object (106) from one or more objects in transit. In an embodiment, each of the one or more objects (106) in transit may be configured with a label unit (110) for collection of one or more tracking and monitoring data, and for damage detection of said objects (106) in transit or the label unit (110). In an embodiment, the one or more objects (106) in transit may be indicative of any products or goods shipped between two geographically separated locations. In an example, the one or more objects (106) in transit may be a hardware appliance being shipped from a seller in one geographical region to a customer in another geographical region.

In an embodiment, each label unit (110) may have a corresponding subscriber identifier attribute. In an embodiment, the subscriber identifier attribute may be a Mobile Station International Subscriber Directory Number (MSISDN) number associated with a Subscriber Identity Module (SIM) of the corresponding label unit (110). In an embodiment, each of the label units (110) may also include a set of unique identifier attributes associated thereto. In an embodiment, the set of unique identifier attributes of the label units (110) may be indicative of any one or combination of an International Mobile Equipment Identifier (IMEI) number, an Integrated Circuit Card Identification Number (ICCIN), and an International Mobile Subscriber Identity (IMSI) associated with the corresponding label unit (110). In an embodiment, the label units (110) may be indicative of a physical SIM, an Integrated Subscriber Identity Module (iSIM), an e-SIM, and the like, but not limited thereof, for communicating with other label units (110) or the tracking system (102).

In an embodiment, one or more label units (110) may include one or more sensors (116) that detect and collect one or more tracking and monitoring data from the corresponding object (106) in transit. In an embodiment, the one or more sensors (116) may be configured to detect damage caused to the one or more label units (110) or to the corresponding object (106) in transit. The one or more sensors (116) may include, but not be limited to, accelerometers, compasses, gyroscopes, Global Positioning System (GPS), altimeters, image sensors, temperature sensors, humidity sensors, optical sensors, pneumatic sensors, gas sensors, and chemical or biological contaminant sensors. In an embodiment, the one or more sensors (116) may be configured to detect location, damage, and other sensor data including, but not limited to, health, orientation, temperature, and shipping status, and the like. In an embodiment, the one or more sensors (116) may be configured to read sensor data from an external networked sensor that is in close proximity with the one or more label units (110), over a Bluetooth or wireless fidelity (Wi-Fi) wireless network.

In an embodiment, the one or more label units (110) may include an audio-visual unit (114) to provide any one or combination of audio and visual indications of damage to the one or more label units (110) to an operator of the system (100). In an embodiment, the audio-visual unit (114) may display instructions for replacing said label units (110) when damaged.

In an embodiment, each of the one or more label units (110) may include a communication unit (112) for transmitting to and receiving data from the tracking system (102). In an embodiment, the communication unit (112) may be associated with a connector interface (122) via which a first label unit (110-1) from the one or more label units (110) may communicate with a second label unit (110-2) from said one or more label units (110).

Figure 3:
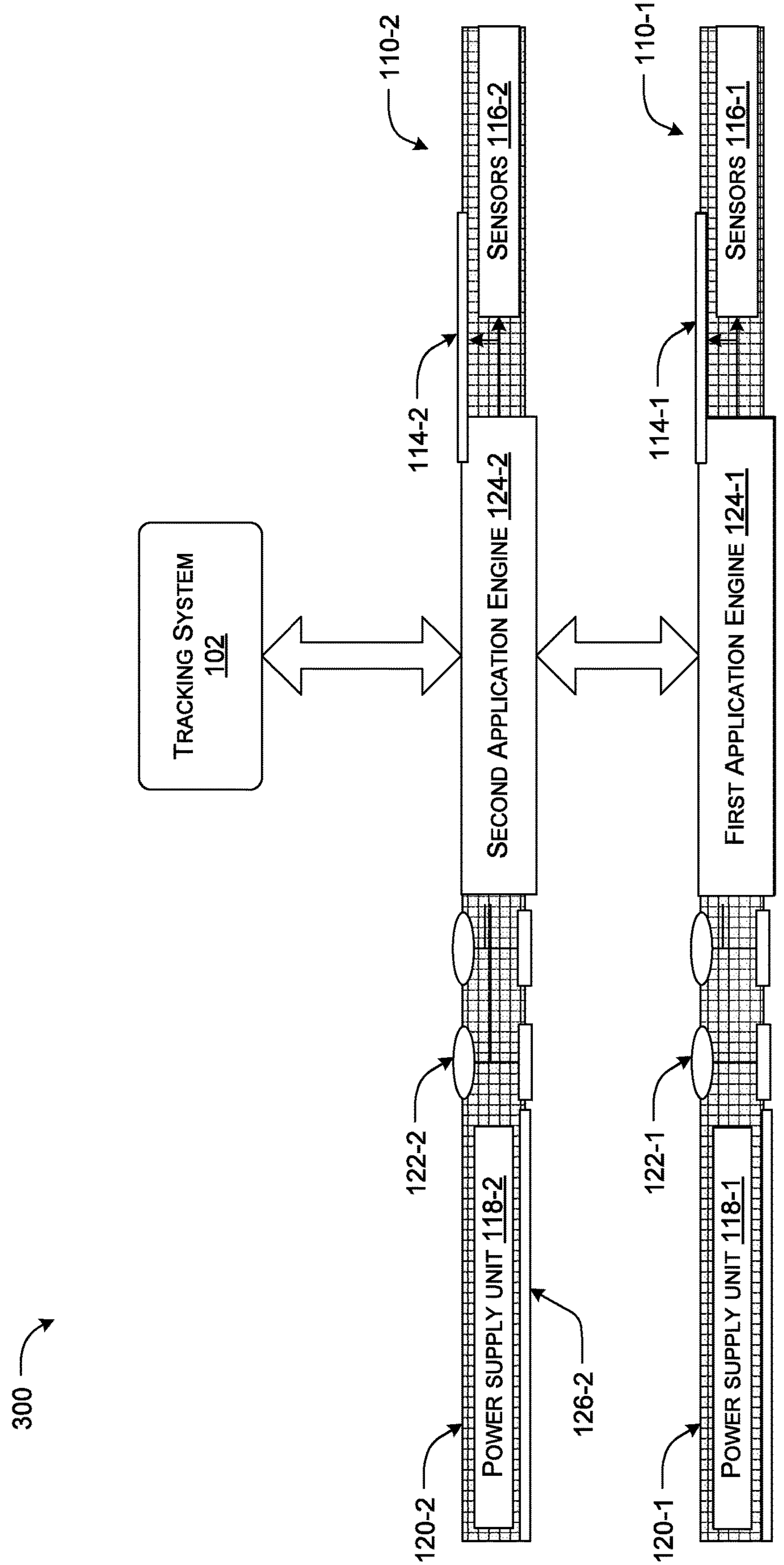
FIG. 3 illustrates an exemplary representation (300) of conductive strips (120) associated with a first label unit (110-1) and a second label unit (110-2), in accordance with an embodiment of the present disclosure.

In an embodiment, the label units (110) may include a conductive strip (120) covering said label units (110) such that when said label unit (110) may be damaged, the conductive strip (120) causes the one or more sensors (116) to detect the damage and transmit a first set of signals to the tracking system (102) via the communication unit (112). In an embodiment, the conductive strip (120) may cover the label units (110). The conductive strip (120) may communicate with the one or more sensors (116) and may be configured to detect conditions including, but not limited to, damage or tear caused to the one or more label units (110). In an embodiment, the conductive strip (120) may include an adhesive portion (126) (as shown in FIG. 3) that may be used to securely configure the label units (110) to the objects (106) in transit.

In an embodiment, the first label unit (110-1) may be replaced by the second label unit (110-2) based on the first label unit (110-1) being damaged. In an embodiment, the subscriber identifier attribute of the first label unit (110-1) may be transferred to the second label unit (110-2) after said replacement.

In an embodiment, when the first label unit (110-1) is replaced with the second label unit (110-2), the second label unit (110-2) may be configured to transmit a third set of signals with said subscriber identifier attribute and the second set of unique identifier attributes to a Home Subscriber Server (HSS) (108) of a cellular network (104) such that the SIM associated with the first label unit (110-1) is deactivated and the subscriber identifier attribute associated with the first label unit (110-1) is transferred to the second label unit (110-2) by the HSS (108).

In an embodiment, the one or more label units (110) may have an application engine (124) configured to execute one or more processor-executable instructions. In an embodiment, on replacement, a first application engine (124-1) associated with the first label unit (110-1) and a second application engine (124-2) of the second label unit (110-2) may establish a 2-way encrypted communication channel therebetween via corresponding connector interfaces (122). The first application engine (124-1) may be configured to transmit the subscriber identifier attribute and the first set of unique identifier attributes to the second application engine (124-2), and the second label unit (110-2) may be configured to use the subscriber identifier attribute transmitted thereto to communicated with the tracking system (102) via the cellular network (104).

In an embodiment, the tracking system (102) may be communicatively coupled to the one or more label units (110) via the cellular network (104). In an embodiment, the cellular network (104) may be a wireless communication network including, but not limited to, a Second Generation (2G), a Third Generation (3G), a Fourth Generation (4G), a Fifth Generation (5G), a Sixth Generation (6G), a Long-Term Evolution (LTE) network, a New Radio (NR), a Narrow-Band (NB), an Internet of Things (IoT) network, a Global System for Mobile Communications (GSM) network and a Universal Mobile Telecommunications System (UMTS) network, combinations thereof, and the like. In other embodiments, the system (102) may be suitably adapted when the cellular network (104) may be indicative of any one or combination of a Bluetooth, a Zigbee, a Near Field Communication (NFC), a Wireless-Fidelity (Wi-Fi) network, a Light Fidelity (Li-FI) network, a carrier network including a circuit-switched network, a packet switched network, a Public Switched Telephone Network (PSTN), a Content Delivery Network (CDN) network, an Internet, intranets, Local Area Networks (LANs), Wide Area Networks (WANs), and the like. In an exemplary embodiment, the cellular network (104) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The cellular network (104) may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In an embodiment, the tracking system (102) may be implemented in a computing device. In an embodiment, computing device may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, servers including, but not limited to, a stand-alone server, a remote server, a cloud computing server, a dedicated server, a rack server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, and the like. The computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the user computing device may not be restricted to the mentioned devices and various other devices may be used. A smart computing device may be one of the appropriate systems for storing data and other private/sensitive information.

Figure 2:
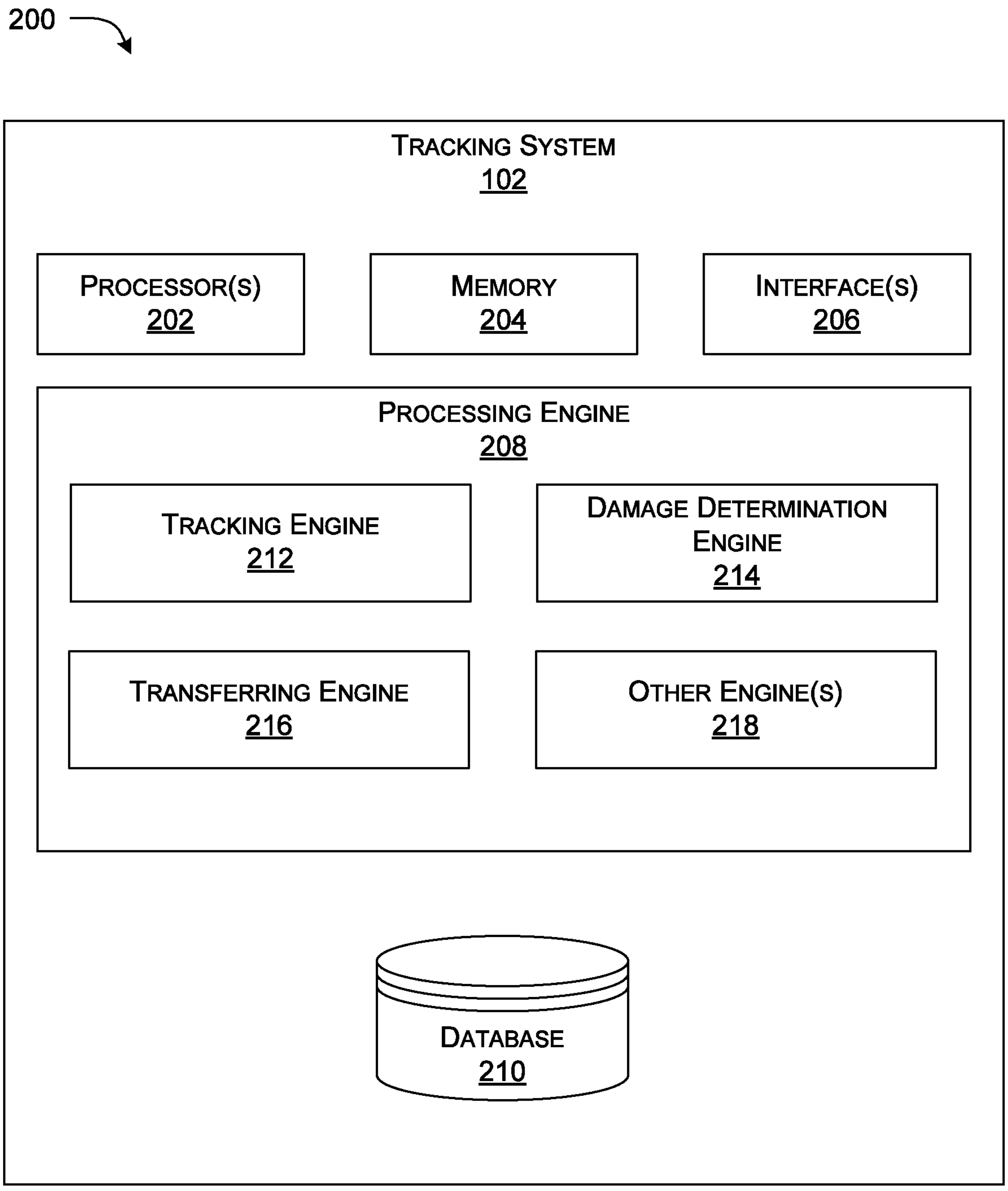
FIG. 2 illustrates an exemplary block diagram (200) of a tracking system (102), in accordance with an embodiment of the present disclosure.

In an example, the system (102) may include a cloud solution backend, where assignment and tracking of objects (106) in transit may be performed via the one or more label units (110). The backend may consist of a communication module to communicate with the one or more label units (110), and a business engine (not shown) for tracking and tracing the one or more label units (110). The system (102)

may include a database (210) (as shown in FIG. 2) that stores the required tracking and health information of the objects (106) in transit. The system (102) may include an application programming interface (API) engine (not shown) to consume the generated information and a presentation engine (not shown) for visual representation of the data, including, but not limited to, via portal, mobile application, and the like.

In an embodiment, the tracking system (102) may be configured to receive a second set of signals from the second label unit (110-2) having the subscriber identifier attribute and a second set of unique identifier attributes associated with the second label unit (110-2). In an embodiment, the tracking system (102) may update a database (210) coupled to the tracking system 102 such that a first set of unique identifier attributes of the first label unit (110-1) associated with the subscriber identifier attribute may be replaced with the second set of unique identifier attributes of the second label unit (110-2).

In an embodiment, the tracking system (102) may track the object (106) in transit by receiving the one or more tracking and monitoring data from the second label unit (110-2). In an embodiment, to update the database (210), the tracking system (102) may be configured to verify identifier of the second label unit (110-2) by mapping the unique identifier attributes associated with the subscriber identifier attribute stored in the database (210) with the second set of unique identifier attributes in the second set of signals. The second set of signals may include the subscriber identifier attribute that was transferred to the second label unit (110-2). In an embodiment, the tracking system (102) may then determine whether the current location of the object (106) in transit provided in the one or more tracking and monitoring data in the second set of signals may be in an expected path of said object (106) in transit.

In an embodiment, the SIM associated with the first label unit (110-1) may be deactivated and the subscriber identifier attribute associated with the first label unit (110-1) may be transferred to the second label unit (110-2) when the tracking system (102) transmits a third set of signals with said subscriber identifier attribute and the second set of unique identifier attributes to the HSS (108) of the cellular network (104) on determining that the first label unit (110-1) may be damaged to initiate said transfer.

In an embodiment, to determine whether the first label unit (110-1) may be damaged, the tracking system (102) may be configured to receive a first set of signals from the first label unit (110-1) indicating damage caused thereto and determine that said first label unit (110-1) may be damaged. In an embodiment, the tracking system (102) may determine that the first label unit (110-1) is damaged if the time from the last signal received from the first label unit (110-1) may be greater than a predetermine time threshold.

In an embodiment, the tracking system (102) may be configured to transmit a fourth set of signals to an operator at a subsequent location of a path associated with the objects (106) in transit if the first label unit (110-1) may be damaged. In such embodiments, the audio-visual unit (114) may be configured to display instructions for replacing said first label unit (110-1).

In an embodiment, the one or more label units (110) may include one or more power supply units (118) indicative of including, but not limited to, electrical power supply, one or more batteries, thermoelectric generators, piezoelectric generators, and the like. The one or more power supply units (118) may provide power to the one or more sensors (116), the application engine (124), and the communication unit (112).

FIG. 2 illustrates an exemplary block diagram (200) of the tracking system (102), in accordance with an embodiment of the present disclosure. In an embodiment, the tracking system (102) may include one or more processors (202) coupled with a memory (204), wherein the memory (204) may store instructions which when executed by the one or more processors (202) may cause the system (102) to facilitate tracking smart label units (110). In an aspect, the system (102) may include one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processors (202) may be configured to fetch and execute computer-readable instructions stored in a memory (204) of the system (102). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as Random Access Memory (RAM), or non-volatile memory such as Erasable Programmable Read-Only Memory (EPROM), flash memory, and the like.

In an embodiment, the system (102) may include an interface(s) (206). The interface(s) (206) may include a variety of interfaces, for example, interfaces for data input and output devices, referred to as I/O devices, storage devices, and the like. The interface(s) (206) may facilitate communication of the system (102). The interface(s) (206) may also provide a communication pathway for one or more components of the system (102). Examples of such components include, but are not limited to, processing engine(s) (208) and a database (210).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may include a processing resource (for example, one or more processors), to execute such instructions. In the present examples, the machine-readable storage medium may store instructions that, when executed by the processing resource, implement the processing engine(s) (208). In such examples, the system (102) may comprise the machine-readable storage medium storing the instructions and the processing resource to execute the instructions, or the machine-readable storage medium may be separate but accessible to the system (102) and the processing resource. In other examples, the processing engine(s) (208) may be implemented by electronic circuitry.

The processing engine (208) may include one or more engines selected from any of a tracking engine (212), a damage determination engine (214), a transferring engine (216), and other engines (218).

In an embodiment, the tracking engine (212) may be configured to receive the one or more tracking and monitoring data from the one or more label units (110). In an embodiment, tracking engine (212) may be used for analyzing the location, health, movement data, but not limited thereto, of the objects (106) in transit in real-time. In an embodiment, the tracking engine (212) may also provide a dashboard for manual analysis of said data.

In an embodiment, the damage determination engine (214) may determine if the first label unit (110-1) is damaged. In some embodiments, the damage determination engine (214) may determine that the first label unit (110-1) is damaged when the damage determination engine (214) receives a first set of signals from the first label unit (110-1) indicating damage caused thereto. In other embodiments, the damage determination engine (214) may determine that said first label unit (110-1) is damaged if the time from the last signal received from the first label unit (110-1) may be greater than a predetermine time threshold.

In an embodiment, the transferring engine (216), when the damage determination engine (214) determines that the first label unit (110-1) is damaged, may transmit the third set of signals with said subscriber identifier attribute and the second set of unique identifier attributes to the HSS (108) of the cellular network (104). In an embodiment, the SIM associated with the first label unit (110-1) may be deactivated and the subscriber identifier attribute associated with the first label unit (110-1) may be transferred to the second label unit (110-2) on transmission of the third set of signals.

In an aspect, a user equipment (UE) may include one or more processors, and a memory operatively coupled to the one or more processors, wherein the memory may include processor-executable instructions, which on execution, cause the one or more processors to transmit a fifth set of signals to the tracking system (102) requesting one or more tracking and monitoring data on the object (106) in transit using a subscriber identifier attribute associated with a first label unit (110-1) attached to said object (106), the first label unit (110-1) being replaced by a second label unit (110-2) and the subscriber identifier attribute being transferred to the second label unit (110-2) on said replacement. The subscriber identifier attribute may be transferred to the second label unit (110-2) on transmission of a third set of signals by the second label unit (110-2) or the tracking system (102). The processor may receive a sixth set of signals from the tracking system (102) having the requested one or more tracking and monitoring data. In an embodiment, the UE (130) may be implemented on any computing device having one or more input and output interfaces to allow an operator of said UE (130) to access the one or more tracking and monitoring data associated with the object (106) in transit.

In an aspect, the present disclosure relates to a non-transitory computer-readable medium may include processor-executable instructions that implement the system and the method of the present disclosure.

FIG. 3 illustrates an exemplary representation (300) of the conductive strips (120) associated with the first label unit (110-1) and the second label unit (110-2), in accordance with an embodiment of the present disclosure.

As illustrated in FIG. 3, the first label unit (110-1) may have a first audio-visual unit (114-1), a first set of sensors (116-1), a first power source unit (118-1), a first connector interface (122-1), and a first adhesive portion (126-1) associated thereto, on a first conductive strip (120-1). Further, the second label unit (110-2) may have a second audio-visual unit (114-2), a second set of sensors (116-2), a second power source unit (118-2), a second connector interface (122-2), and a second adhesive portion (126-2) associated thereto, on a second conductive strip (120-2).

In an embodiment, the first conductive strip (120-1) may be configured to detect damage caused to the first label unit (110-1) or the object (106) in transit associated thereto. On detection of said damage, the first conductive strip (120-1) may cause the first label unit (110-1) to transmit a first set of signals to the tracking system (102), indicating that said first label unit (110-1) is damaged. Thereon, the first label unit (110-1) may be replaced with the second label unit (110-2). When the connector interface (122-2) of the second label unit (110-2) is aligned with the connector interface (122-1) of the first label unit (110-1), said first label unit (110-1) may transmit the subscriber identifier attribute to the second label unit (110-2). The second label unit (110-2) may then transmit the second set of signals to the tracking system (102) to update the database (210) via the cellular network (104). On using the cellular network (104) with the subscriber identifier attribute of the first label unit (110-1), the HSS (108) associated with the cellular network (104) may transfer the subscriber identifier attribute to the second label unit (110-2). In an embodiment, the tracking system (102) may associate the one or more tracking and monitoring data collected by the second label unit (110-2) with the appropriate object (106) in transit.

Figure 4:
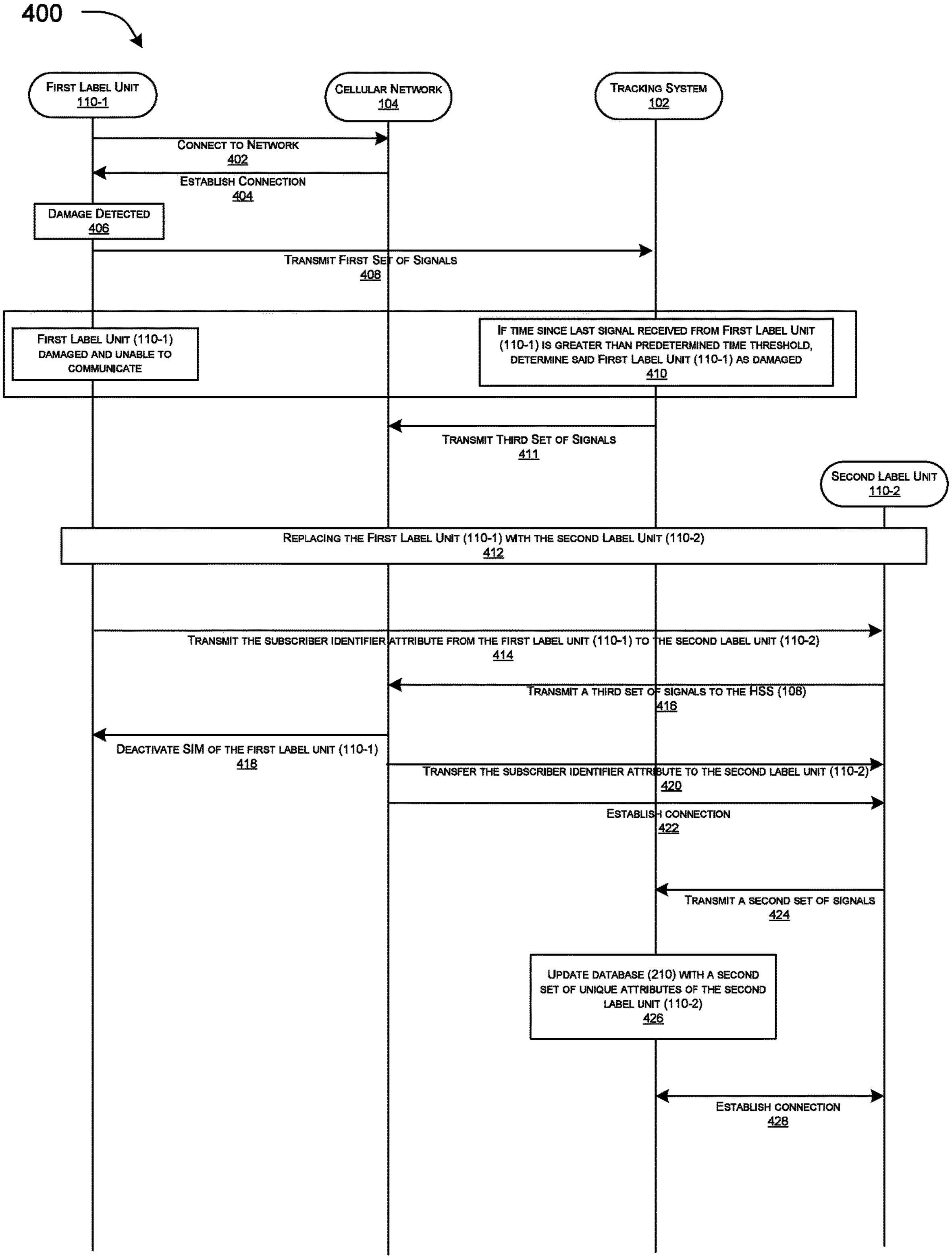
FIG. 4 illustrates a sequence diagram of an example method (400) for transferring subscriber identifier attributes of label units (110) on replacement, in accordance with an embodiment of the present disclosure.

FIG. 4 illustrates a sequence diagram of an example method (400) for transferring subscriber identifier attributes of label units (110) on replacement, in accordance with an embodiment of the present disclosure.

In an embodiment, the first label unit (110-1) may be configured to self-trigger the transfer of the subscriber identifier attribute associated therewith. At step (402), the method may include connecting the first label unit (110-1) to the cellular network (104). At step (404), the method (400) may include establishing a connection therebetween.

At step (406), the first label unit (110-1) may detect damage caused thereto or to the object (106) in transit associated with said first label unit (110-1). In an embodiment, the first label unit (110-1) may detect damage when one or more tracking and monitoring data collected by the one or more sensors (116) exceed a predetermined threshold. In such embodiments, at step (408), the method (400) may include transmitting, by the first label unit (110-1), a first set of signals to the tracking system (102). The first set of signals may include indications of the nature of damage caused to the first label unit (110-1) or the objects (106) in transit associated thereto. In embodiments where the first label unit (110-1) is damaged such that said first label unit (110-1) is unable to communicate with the tracking system (102), at step (410), the method may include determining, by the tracking system (102), that the first label unit (110-1) is damaged if time since last signal received from said first label unit (110-1) exceeds a predetermined time threshold.

At step (412), the method may include replacing the first label unit (110-1) with the second label unit (110-2). At step (414), the method may include transmitting the subscriber identifier attribute from the first label unit (110-1) to the second label unit (110-2). In an embodiment, the subscriber identifier attribute may be transmitted by a first application engine (124-1) of the first label unit (110-1) to a second application engine (124-2) of the second label unit (110-2). At step (416), the method may include transmitting, by the second label unit (110-2), a third set of signals to the HSS (108) of the cellular network (104) to initiate transfer of the subscriber identifier attribute. In an embodiment, the third set of signals may include the subscriber identifier attribute of the first label unit (110-1). In an embodiment, the third set of signals may also include the second set of unique identifier attributes of the second label unit (110-2). At step (418), the method may include deactivating, by the HSS (108), the SIM associated with the first label unit (110-1). At step (420), the method may include transferring, by the HSS (108), the subscriber identifier attribute from the first label unit (110-1) to the second label unit (110-2). In an embodiment, the subscriber identifier attribute may be transferred based on the second set of unique identifier attributes. At step (422), the method may include establishing a connection between the second label unit (110-2) and the cellular network (104) via the subscriber identifier attribute.

At step (424), the method may include transmitting, by the second label unit (110-2), a second set of signals to the tracking system (102). In an embodiment, the second set of signals may include the subscriber identifier attribute transferred to the second label unit (110-2). In an embodiment, the second set of signals may also include the one or more tracking and monitoring data collected by the one or more sensors (116-2) of the second label unit (110-2). In an embodiment, the second set of signals may include the second set of unique identifier attributes of the second label unit (110-2). At step (426), the method may include updating, by the tracking system (102), a database (210) such that a first set of unique identifier attributes of the first label unit (110-1) associated with the subscriber identifier attribute is replaced with the second set of unique identifier attributes of the second label unit (110-2). At step (428), the method may include establishing connection between the second label unit (110-2) and the tracking system (102) such that said tracking system (102) receives the one or more tracking and monitoring data from the second label unit (110-2) and associates said data with the object (106) in transit originally tracked by the first label unit (110-1).

In an alternative embodiment, the method, at step (411), may include transmitting, by the tracking system (102), a third set of signals with said subscriber identifier attribute and the second set of unique identifier attributes to the HSS (108) of the cellular network (104) on determining that the first label unit (110-1) is damaged, such as at step (408) or step (410), to initiate said transfer. On receiving the third set of signals, the HSS (108) may deactivate a SIM associated with the first label unit (110-1) and transfer the subscriber identifier attribute associated with the first label unit (110-1) to the second label unit (110-2), as at step (420).

Figure 5:
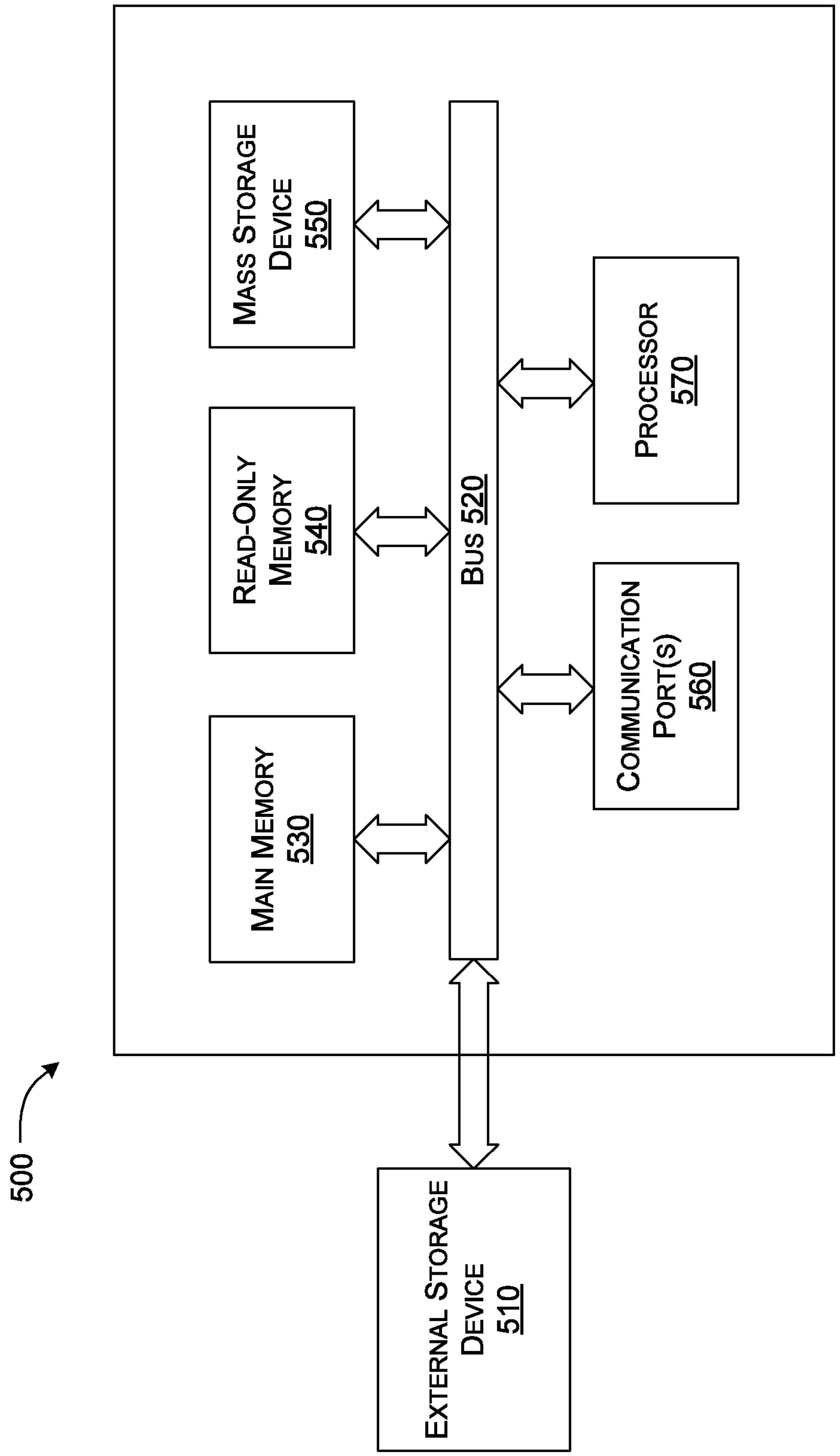
FIG. 5 illustrates an exemplary computer system (500) in which or with which embodiments of the present disclosure may be utilized in accordance with embodiments of the present disclosure.

FIG. 5 illustrates an exemplary computer system (500) in which or with which embodiments of the present disclosure may be utilized in accordance with embodiments of the present disclosure.

As shown in FIG. 5, the computer system (500) may include an external storage device (510), a bus (520), a main memory (530), a read only memory (540), a mass storage device (550), communication port (560), and a processor (570). A person skilled in the art will appreciate that the computer system (500) may include more than one processor and communication ports. The processor (570) may include various modules associated with embodiments of the present disclosure. The communication port (560) may be any of an RS-242 port for use with a modem-based dialup connection, a 6/60 Ethernet port, a Gigabit or 6 Gigabit port using copper or fiber, a serial port, a parallel port, or other existing or future ports. The communication port (560) may be chosen depending on a network, such a Local Area Network (LAN), Wide Area Network (WAN), or any network to which computer system connects. The memory (530) may be Random Access Memory (RAM), or any other dynamic storage device commonly known in the art. The read-only memory (530) may be any static storage device(s) e.g., but not limited to, a Programmable Read Only Memory (PROM) chips for storing static information. The mass storage (550) may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

The bus (520) may communicatively couple the processor(s) (570) with the other memory, storage, and communication blocks. The bus (520) may be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects the processor (570) to the computer system (500).

Optionally, operator and administrative interfaces, e.g., a display, keyboard, and a cursor control device, may also be coupled to the bus (520) to support direct operator interaction with the computer system (500). Other operator and administrative interfaces may be provided through network connections connected through the communication port (560). The external storage device (510) may be any kind of external hard-drives, floppy drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system (500) limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides a system and a method for transferring subscriber identifier attribute of label units on replacement.

The present disclosure provides a system and a method for seamless replacement of a first label unit that is damaged with a second label unit without loss in tracking information associated with objects in transit.

The present disclosure provides a system and a method that associates the unique identifier of the first label unit with the second label unit after replacement, so as to identify the object that the monitoring and tracking data collected by the second label unit relates to.

The present disclosure provides a system and a method that notifies operators of the system of damage caused to the first label unit for timely replacement.

The present disclosure provides a system and a method that ensures continuous tracking and monitoring of the object in transit even when the label unit associated thereto is damaged.

We claim:

1. A system for tracking label units, the system comprising:

one or more label units attached to a corresponding object from one or more objects in transit, a first label unit from the one or more label units being replaced by a second label unit from the one or more label units based on said first label unit being damaged, wherein a subscriber identifier attribute of the first label unit is transferred to the second label unit after said replacement;

a tracking system having one or more processors coupled to a memory, the memory having one or more processor-executable instructions, which when executed, cause the one or more processors to:

receive a second set of signals from the second label unit having the subscriber identifier attribute and a second set of unique identifier attributes associated with the second label unit;

update a database coupled to the tracking system such that a first set of unique identifier attributes of the first label unit associated with the subscriber identifier attribute is replaced with the second set of unique identifier attributes of the second label unit; and track the object in transit by receiving one or more tracking and monitoring data from the second label unit, wherein when the first label unit is replaced by the second label unit, the second label unit is configured to transmit a third set of signals with said subscriber identifier attribute and the second set of unique identifier attributes to a Home Subscriber Server (HSS) of a cellular network such that a Subscriber Identity Module (SIM) associated with the first label unit is deactivated and the subscriber identifier attribute associated with the first label unit is transferred to the second label unit by the HSS.

2. The system as claimed in claim 1, wherein the subscriber identifier attribute is a Mobile Station International Subscriber Directory Number (MSISDN) number associated with a Subscriber Identity Module (SIM) of the corresponding label unit, and the first or second set of unique identifier attributes is indicative of any one or combination of: an International Mobile Equipment Identity (IMEI) number, an Integrated Circuit Card Identification Number (ICCIN), and an International Mobile Subscriber Identity (IMSI) of the corresponding label unit.

3. The system as claimed in claim 1, wherein on said replacement, a first application engine of the first label unit and a second application engine of the second label unit establish a 2-way encrypted communication channel therebetween via corresponding connector interfaces, the first application engine being configured to transmit the subscriber identifier attribute and the first set of unique identifier attributes to the second application engine, and the second label unit being configured to use the subscriber identifier attribute transmitted thereto to communicate with the tracking system via the cellular network.

4. The system as claimed in claim 1, wherein the SIM associated with the first label unit is deactivated and the subscriber identifier attribute associated with the first label unit is transferred to the second label unit when the tracking system transmits the third set of signals with said subscriber identifier attribute and the second set of unique identifier attributes to the HSS of the cellular network on determining that the first label unit is damaged to initiate said transfer.

5. The system as claimed in claim 4, wherein to determine whether the first label unit is damaged, the one or more processors are configured to:

receive a first set of signals from the first label unit indicating damage caused thereto and determine that said first label unit is damaged; or determine that the first label unit is damaged if a time from a last signal received from the first label unit is greater than a predetermined time threshold.

6. The system as claimed in claim 1, wherein the one or more processors are configured to transmit a fourth set of signals to an operator at a subsequent location of a path associated with the objects in transit if the first label unit is damaged.

7. The system as claimed in claim 1, wherein each of the one or more label units comprise:

a communication unit for transmitting to and receiving data from the tracking system; and a conductive strip covering the label unit such that when said label unit is damaged, the conductive strip causes one or more sensors to detect the damage and transmit a first set of signals to the tracking system via the communication unit.

8. The system as claimed in claim 1, wherein the label unit comprises:

one or more sensors that detect and collect the one or more tracking and monitoring data from the object in transit;

an audio-visual unit to provide any one or combination of audio and visual indications of damage to the label unit to an operator of the system.

9. The system as claimed in claim 1, wherein to update the database, the one or more processors are configured to:

verify identity of the second label unit by mapping the first set of unique identifier attributes associated with the subscriber identifier attribute stored in the database with the second set of unique identifier attributes in the second set of signals, wherein the second set of signals comprises the subscriber identifier attribute that was transferred to the second label unit; and determine whether a current location of the object in transit provided in the one or more tracking and monitoring data in the second set of signals is in a same path as a predetermined transit route of said object in transit.

10. A method for tracking label units, the method comprising:

configuring a first label unit to an object in transit, the first label unit adapted to detect and transmit one or more tracking and monitoring data to a tracking system;

replacing the first label unit with a second label unit based on said first label unit being damaged, wherein a subscriber identifier attribute of the first label unit is transferred to the second label unit after said replacement;

receiving, by the tracking system, a second set of signals from the second label unit having the subscriber identifier attribute and a second set of unique identifier attributes associated with the second label unit;

updating, by the tracking system, a database coupled to the tracking system such that a first set of unique identifier attributes of the first label unit associated with the subscriber identifier attribute is replaced with the second set of unique identifier attributes of the second label unit; and tracking, by the tracking system, the object in transit (106) by receiving the one or more tracking and monitoring data from the second label unit, wherein the method comprises transmitting, by the second label unit, a third set of signals with said subscriber identifier attribute and the second set of unique identifier attributes to a Home Subscriber Server (HSS) of a cellular network such that a Subscriber Identity Module (SIM) associated with the first label unit is deactivated and the subscriber identifier attribute associated with the first label unit is transferred to the second label unit by the HSS when the first label unit is replaced by the second label unit.

11. The method as claimed in claim 10, wherein the method comprises establishing a 2-way encrypted communication channel between a first application engine associated with the first label unit and a second application engine of the second label unit via corresponding connector interfaces on said replacement, the first application engine being configured to transmit the subscriber identifier attribute and the first set of unique identifier attributes to the second application engine, and the second label unit being configured to use the subscriber identifier attribute transmitted thereto to communicate with the tracking system via a cellular network.

12. The method as claimed in claim 10, wherein the method comprises transmitting, by the tracking system, the third set of signals with said subscriber identifier attribute and the second set of unique identifier attributes to the HSS of the cellular network on determining that the first label unit is damaged to initiate said transfer such that the SIM associated with the first label unit is deactivated and the subscriber identifier attribute associated with the first label unit is transferred to the second label unit by the HSS when the first label unit is replaced by the second label unit.

13. The method as claimed in claim 12, wherein to determine whether the first label unit is damaged, the method comprises:

receiving, by the tracking system, a first set of signals from the first label unit indicating damage caused thereto and determine that said first label unit is damaged; or determining, by the tracking system, that the first label unit is damaged if a time from a last signal received from the first label unit is greater than a predetermined time threshold.

14. The method as claimed in claim 10, wherein the method comprises transmitting a fourth set of signals to an operator at a subsequent location of a path associated with the object in transit if the first label unit is damaged.

15. The method as claimed in claim 10, wherein the method comprises receiving, by the tracking system, a first set of signals transmitted by one or more label units when a conductive strip covering said one or more label units is damaged, and wherein the conductive strip causes one or more sensors to detect the damage.

16. The method as claimed in claim 10, wherein the method comprises providing, by an audio-visual unit associated with the first label unit, any one or combination of audio and visual indications of damage to the first label unit.

17. The method as claimed in claim 10, wherein for updating the database, the method comprises:

verifying identity of the second label unit by mapping the first set of unique identifier attributes associated with the subscriber identifier attribute stored in the database with the second set of unique identifier attributes in the second set of signals, wherein the second set of signals comprises the subscriber identifier attribute that was transferred to the second label unit; and determining whether a current location of the object in transit provided in the one or more tracking and monitoring data in the second set of signals is in a same path as a predetermined transit route of said object in transit.

18. A user equipment, comprising:

one or more processors; and a memory operatively coupled to the one or more processors, wherein the memory comprises processor-executable instructions, which on execution, cause the one or more processors to:

transmit a fifth set of signals to a tracking system requesting one or more tracking and monitoring data for an object in transit using a subscriber identifier attribute associated with a first label unit attached to said object, the first label unit being replaced by a second label unit and the subscriber identifier attribute being transferred to the second label unit on said replacement, wherein the subscriber identifier attribute is transferred to the second label unit on transmission of a third set of signals by the second label unit or the tracking system; and receive a sixth set of signals from the tracking system having the requested one or more tracking and monitoring data, wherein when the first label unit is replaced by the second label unit, the second label unit is configured to transmit a third set of signals with said subscriber identifier attribute and the second set of unique identifier attributes to a Home Subscriber Server (HSS) of a cellular network such that a Subscriber Identity Module (SIM) associated with the first label unit is deactivated and the subscriber identifier attribute associated with the first label unit is transferred to the second label unit by the HSS.

19. A non-transitory computer-readable medium comprising processor-executable instructions that cause a processor to:

receive a second set of signals from a second label unit having a subscriber identifier attribute and a second set of unique identifier attributes associated with the second label unit, the subscriber identifier attribute of a first label unit being transferred to the second label unit when said first label unit is damaged;

update a database coupled to a tracking system such that a first set of unique identifier attributes of the first label unit associated with the subscriber identifier attribute is replaced with the second set of unique identifier attributes of the second label unit; and track an object in transit by receiving one or more tracking and monitoring data from the second label unit, wherein when the first label unit is replaced by the second label unit, the second label unit is configured to transmit a third set of signals with said subscriber identifier attribute and the second set of unique identifier attributes to a Home Subscriber Server (HSS) of a cellular network such that a Subscriber Identity Module (SIM) associated with the first label unit is deactivated and the subscriber identifier attribute associated with the first label unit is transferred to the second label unit by the HSS.

* * * * *